July 27, 1965
G. W. BAUGHMAN
3,197,632
HOT BEARING DETECTOR
Filed July 20, 1959
3 Sheets-Sheet 1
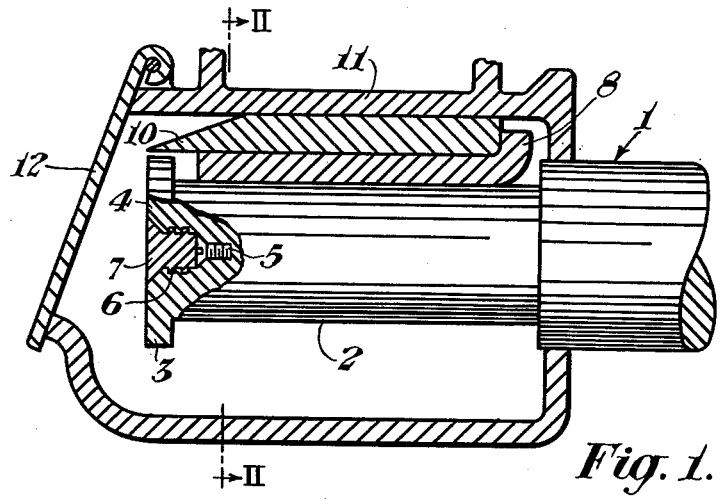
Fig. 1.
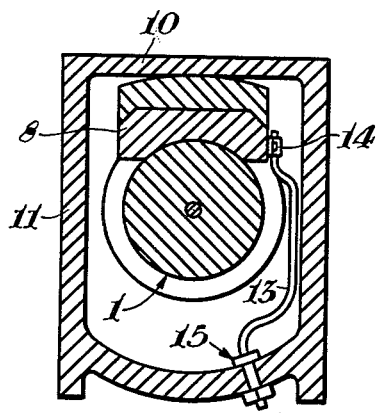
Fig. 2.
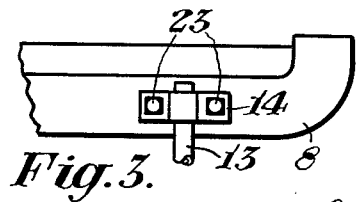
Fig. 3.
Fig. 4.
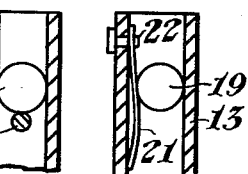
Fig. 5.
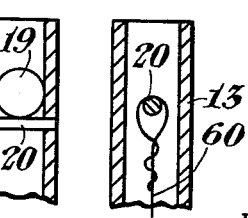
Fig. 6. Fig. 8.
Fig. 7. Fig. 9.
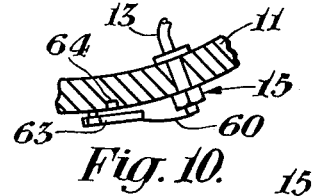
Fig. 10.
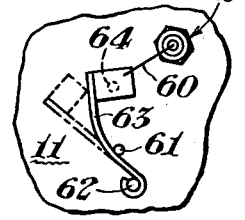
Fig. 11.
INVENTOR.
George W. Baughman
BY
W. L. Stout
HIS ATTORNEY United States Patent Office 3,197,632
Patented July 27, 1965

3,197,632
HOT BEARING DETECTOR
George W. Baughman, Swissvale, Pa., assignor to Westinghouse Air Brake Company, Wilmerding, Pa., a corporation of Pennsylvania
Filed July 20, 1959, Ser. No. 828,134
4 Claims. (Cl. 246—169)

This invention relates to hot bearing detectors for railway cars.

One of the most pressing problems in railroad maintenance today is the detection of overheated bearings. While normal maintenance procedures are designed to keep hot bearings to a minimum, when a bearing does become overheated and remains undetected, not only the bearings but also the axle itself may be permanently damaged, and in some instances the train may be derailed.

Many efforts have been made in the past to provide suitable means for detecting an overheated bearing on a train before permanent damage is done, and to warn the crew of the train in time to permit it to be stopped and the defective bearing to be overhauled. However, none of these means has yet proved entirely satisfactory in actual service, so far as I am aware. Accordingly, it is the primary object of my invention to provide simple and reliable means for detecting and indicating the presence of overheated bearings.

It is a further object of my invention to provide improved means for detecting the relative position of a defective bearing in a train.

It is a further object of my invention to provide improved means for actuating a signal in response to the presence of an overheated bearing on a train.

Other objects and further advantages of my invention will become apparent to those skilled in the art as the description proceeds.

In practicing my invention, I provide adjacent each wheel of a car to be protected by my invention a small amount of a radioactive substance. I further provide, adjacent each wheel, means for preventing external radiation from the substance, and means controlled by the temperature of the bearing associated with the wheel for removing the impediment to radiation. On the wayside, I provide a radiation detector which is adapted to respond only when a radioactive source associated with a wheel having a hot bearing is adjacent the radiation detector and is emitting radiation externally of the car. In accordance with one form of my invention, I provide a wheel detector adjacent the radiation detector to provide a pulse of energy each time a wheel passes the radiation detector. I further provide means for counting these pulses, to accumulate a count indicative of the position of the axle in a train passing over the detection apparatus, and I provide means controlled by the radiation detector for transmitting the count accumulated in the counter at the time that a hot bearing is indicated by the response of the radiation detector.

I shall first describe several embodiments of my invention in detail, and shall then point out the novel features thereof in claims.

The several embodiments of my invention will best be understood with reference to the following drawings, in which, FIG. 1 is a side view of a typical railway journal box, partly in cross section, provided with thermally responsive radiation emitting apparatus in accordance with a preferred embodiment of my invention.

FIG. 2 is an end view, partly in cross section, of a journal box of the type shown in FIG. 1, generally as would appear from a section taken along line II—II of FIG. 1, but provided with a second form of thermally responsive radiation emitting apparatus.

FIG. 3 is a side view of a portion of a journal brass of the type shown in the journal box of FIGS. 1 and 2 showing the means of attachment of a copper tube employed in a second embodiment of my invention.

FIG. 4 is a top view of the apparatus of FIG. 3 showing further details of the means for attaching the tube.

FIG. 5 is an expanded cross-sectional view of a detail of FIG. 2 showing the manner in which the tube in the second embodiment is brought through the bottom of the journal box.

FIG. 6 is a transverse cross-sectional view of the upper part of the tube shown in FIGS. 2 through 5, corresponding to the portion shown in FIG. 3.

FIG. 7 is a cross-sectional view similar to FIG. 6 but taken at 90° to the plane of FIG. 6.

FIG. 8 is a cross-sectional view of the same portion of the tube shown in FIGS. 6 and 7 but showing an alternative form of a thermally responsive radiation releasing device.

FIG. 9 is a cross-sectional view of the portion of the tube shown in FIGS. 6–8, provided with still another form of thermally responsive radiation releasing device.

FIG. 10 is a fragmentary view, partly in cross section, of the portion of the journal box of FIG. 2 shown in FIG. 5, showing additional elements of the radiation releasing device of FIG. 9.

FIG. 11 is a plan view of the apparatus of FIG. 10.

Figure 12:
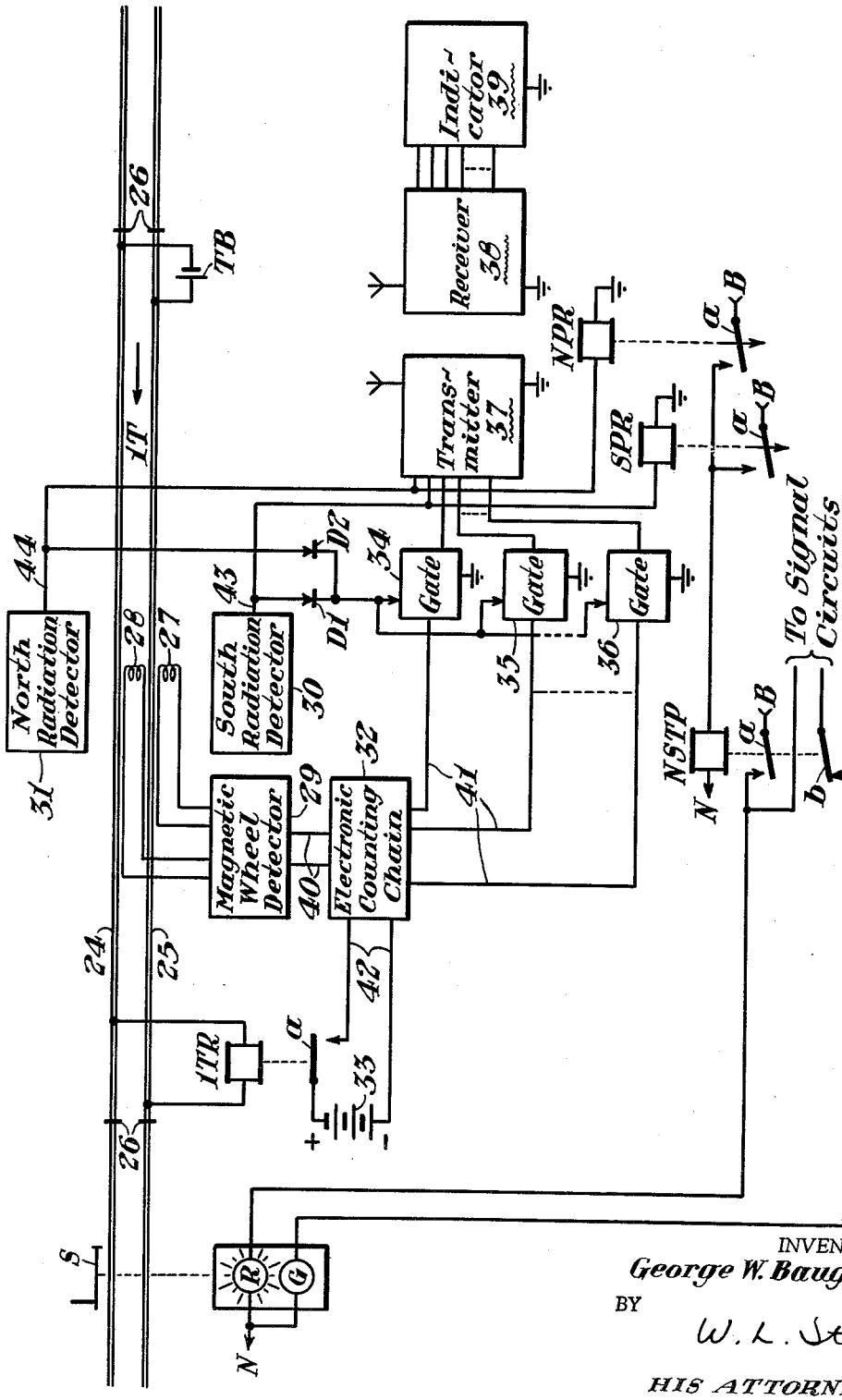
FIG. 12 is a schematic diagram of a radiation detection system in accordance with a preferred embodiment of my invention.

Referring now to FIG. 1, I have shown a typical journal bearing for a railway axle 1 provided intermediate its ends with a journal 2 and at the outward end with a collar 3 in a conventional manner.

As will be familiar to those skilled in the art, journal 2 is provided with a bearing brass 8 which provides the bearing surface for journal 2. A conventional wedge 10 is disposed between the top of brass 8 and the journal box 11. As shown, journal box 11 is provided with a hinged cover 12.

As is conventional in the manufacture of axles, axle 1 is shown provided with a centering hole 4 which is normally employed to support the axle when it is machined. In this embodiment of my invention, the centering hole is enlarged and modified somewhat by the provision of threads at the internal end for the reception of a metal screw 5, and by larger threads or serrations 6 as shown. Screw 5, in accordance with one embodiment of my invention, may be steel alloyed with a desired percentage of cobalt 60, or other suitable source of hard radiation such as gamma rays. In order to prevent external radiation from radioactive screw 5, a plug 7 composed primarily of a good shielding material such as lead or the like is disposed in hole 4. This plug may be screwed in, or may simply be driven into engagement with serrations 6, as by a hammer blow or the like.

Plug 7 is made of a material having, first, the property that it is a relatively good shield against gamma radiation, and, second, that it is fusible at a temperature corresponding to a dangerously hot journal bearing, for example, at 350° F. For example, this material could be 60% lead and 40% bismuth if so desired.

Hole 4 as normally found will not be deep enough to provide sufficient shielding, and accordingly it will be necessary in general to increase the depth of the hole. Since the radiation of screw 5 when exposed must pass through the iron of the journal box, shield 7 should be of such depth as to modify the external radiation by a factor of several times the value with the shield removed. For example, if the thickness of the journal box 11 between screw 5 and an external detector were 1 centimeter, plug 7 might be about 2 to 3 centimeters in depth.

In actual tests, it has been found that the journal temperature corresponds rather closely to the temperature at the face of brass 8, which is the hottest part of the bearing. Accordingly, if the bearing becomes overheated, the material of plug 7 will be heated rapidly until it reaches the melting point, at which time it will be spun off out of hole 4 to expose radioactive screw 5. The increased radiation from screw 5 can then be detected by an external radiation detector.

The thermally responsive radioactive emitter described in connection with FIG. 1 requires a source of hard radiation of sufficient intensity to be readily detectable through the journal box. In order to employ smaller amounts of radioactive material, or to use softer radiation, for example, low energy gamma rays, or beta particles from a source such as carbon 14, the device of FIG. 2 may be used to an advantage. As shown in FIG. 2, a copper tube 13 is fastened against the side of journal brass 8 by a suitable bracket 14, and is passed out through the bottom of the journal box through a fitting 15. As shown in FIGS. 3 and 4, bracket 14 may be secured to the journal brass by bolts 23 or the like, and is shaped to provide close heat conducting relationship between tube 13 and brass 8. As shown in FIGS. 6 and 7, tube 13 may be apertured adjacent fitting 14, or within the fitting if so desired, to provide for the insertion of a pin 20 of fusible material. This material may be the same as that previously described in connection with FIG. 1, except that it need not have any particular shielding effect, and is so selected that it will fuse at temperatures determined dangerous for the bearing and fall away.

Pin 20 supports a pellet 19 of radioactive material. This pellet could be of steel alloyed with cobalt 60 or other source of gamma radiation, or could, for example, be silicon carbide in which the carbon includes appreciable portions of carbon 14.

As will be obvious, upon fusion of pin 20, radioactive pellet 19 will fall down into the tube. As shown in FIG. 5, the end of the tube is slightly crimped to prevent the pellet from falling out on the track. However, in the position shown in FIG. 5, the pellet is adequately exposed so that a radiation detector mounted on the wayside underneath the journal box will respond.

As shown, in FIG. 5, tube 13 is passed through the wall of the journal box 11 by means of a suitable fitting 15 of a type well known in the art, which comprises a plug 16 and a nut 18 which cooperate to seal the hole in the journal box and at the same time to seal the tube aperture by compressing a ferrule 17 surrounding the tube.

FIG. 8 shows a modification of the means for releasing radioactive pellet 19. As shown, this comprises a bimetallic strip 21 riveted to the inside of tube 13 by means of a rivet 22 and initially curved to hold pellet 19 in the position shown. If the journal brass is heated beyond a predetermined temperature, bimetallic strip 21 will flatten out enough to permit pellet 19 to fall down into radiating position. In this embodiment, if a source of beta particles is used, no particular shielding precautions need be taken except for enough of a bend in the tube, as shown in FIG. 2, to prevent direct radiation through an air path with the pellet in its upper position. If gamma radiation is employed, the tube walls must be thick enough to provide adequate shielding.

FIGS. 9, 10 and 11 show a modified means for emitting radiation when the bearing brass becomes overheated. This modification employs a tube 13 arranged as shown in FIG. 2, and as described above. However, in this embodiment, the radioactive emitter is in the form of a pellet 64 attached to or embedded in the outside of the bottom wall of journal box 11, as shown in FIGS. 10 and 11.

Pellet 64 is normally covered by a shield 63, which may be formed in the shape of a flag, as shown, from spring steel. Shield 63 is pivotally mounted to the wall of journal box 11 by means such as a pin 62, and is adapted to be biased out of shielding position by a second pin 61 inserted in the wall of box 11.

Figure 14:
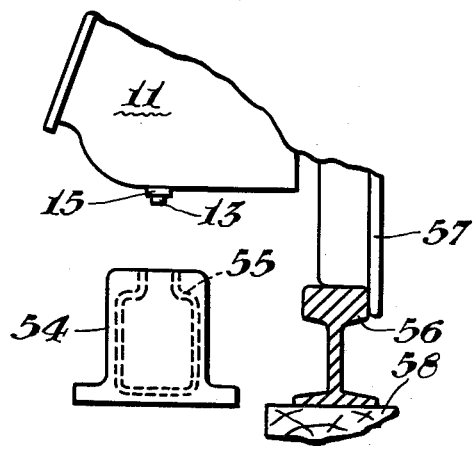
FIG. 14 is a schematic showing of the physical placement of the radiation detector of FIGS. 12 and 13 with respect to the rails and journal box, when used with the apparatus of FIGS. 2–11, and illustrating a form of housing for the radiation detector.

A cable 60 (see FIGS. 9–11) is attached at one end to shield 63 and at the other end to pin 20, which is disposed in tube 13 as previously described. In this embodiment, fusion of pin 20 due to overheating of the bearing will release cable 60 and permit shield 63 to move to its nonshielding position, exposing pellet 64 to an external detector, not shown, but which may be disposed as shown in FIG. 14, to be described. In this embodiment, a relatively small amount of easily shielded material, such as carbon 14, may be employed to form pellet 64, thereby reducing the cost of the installation as well as the possible hazards incident to the use of larger amounts of radioactive material or sources of hard radiation.

FIG. 12 shows a hot bearing detection system in accordance with a preferred embodiment of my invention. As shown, a pair of rails 24 and 25 over which traffic is normally adapted to move in the direction of the arrow is provided with a track section 1T defined by insulated joints 26. In a conventional manner, a track circuit is provided in track section 1T by a track battery TB connected across the rails at one end and a normally energized track relay 1TR connected across the rails at the other end. Thus, when a train occupies section 1T, track relay 1TR will be released and close its back contact a.

Within track section 1T are mounted the detecting coils 27 and 28 of a conventional magnetic wheel detector 29, these coils being disposed on either side of one of the rails as shown. In a manner conventional in the art, a wheel passing between coils 27 and 28 will modify the coupling between these coils and will provide a pulse of current through output leads 40 of detector 29. These pulses are applied to an electronic counting chain 32, which may be of conventional construction. In general, electronic counting chain 32 may be of the type in which a series of vacuum tubes or transistors is provided, such that at each input pulse one of the tubes or transistors is caused to conduct and a succeeding tube or transistor is prepared for conduction at the next pulse. Counting chain 32 is provided with a plurality of output leads 41 which may be arranged to be energized in any selected code combination depending on the count accumulated in the counter. For example, in a simple counter of the type described above, each lead might be energized by one of the tubes or transistors in the counting chain. Such devices are well known in the art, so that it is deemed unnecessary to describe them in detail. The power supply for counting chain 32 may comprise an external battery 33 connected over back contact a of track relay 1TR and leads 42 to the voltage supply circuits of the counting chain. Thus, with track relay 1TR energized as shown, no supply voltage will be provided for the counter and it will automatically be reset to zero. When a train enters track section 1T, track relay 1TR will release and the counter will begin to count as the wheels of the train successively pass coils 27 and 28, so that the count at any time will represent the position of the last counted axle in the train.

Immediately adjacent coils 27 and 28, and on either side of the rails, are mounted two radiation detectors 30 and 31. For reference purposes, these have been indicated as north and south radiation detectors, although it is obvious that in practice the rails may be oriented in any direction and that any other suitable nomenclature may be employed.

The details of these radiation detectors will be described hereinafter. It is sufficient for present purposes to point out that upon the passage of a wheel having a hot bearing, and therefore emitting radiation in any of the manners shown in FIGS. 1 through 11, the detector adjacent the radiating bearing will apply a voltage to its output lead, that is, to output lead 43 in the case of radiation detector 30 and output lead 44 in the case of radiation detector 31.

The output leads 41 of counting chain 32 are applied as shown to a series of conventional electronic gates represented by 34, 35 and 36. As well known in the art, such gates pass an applied signal when energized by a control signal and otherwise will not pass an applied signal. To distinguish the control signal from the applied signal, the control signal leads have been marked with an arrow as shown. The controls for gates 34 through 36 are energized in parallel, as shown, through two parallel circuits from output leads 43 and 44 of radiation detectors 30 and 31, respectively, these output leads being isolated one from the other by diodes D1 and D2.

The outputs of gates 34, 35 and 36 are applied to a transmitter 37 in parallel with leads 43 and 44 of the radiation detectors. Thus, with either or both of the radiation detectors energized, all of the output leads of counting chain 32 as well as the output leads of the radiation detectors will be operatively connected to transmitter 37.

Transmitter 37 may be any conventional apparatus for transmitting an indication from one location to the other, and is here shown as a wireless transmitter such as a radio transmitter or the like. Merely as an example of such a device, each of the input leads could be connected to an oscillator for modulating the transmitter at a different frequency, so that a combination of the frequencies transmitted would characterize the information supplied to the transmitter. As another example, the transmitter might comprise a conventional railway CTC information transmission system employing a pair of line wires. Since these and other examples of transmitting means are conventional, are well known in the art, and do not form a part of my invention, they will not be further described.

A receiver 38, which may be of any conventional kind, is adapted to receive the signals from transmitter 37 and apply them to a conventional indicator 39. If transmitter 37 is modulated by selective frequencies as described above the detector of receiver 38 would be provided with a band-pass filter selective to each of these frequencies to operate a storage device such as a relay or the like. In such a case, the indicator 39 could comprise a series of lamps. On the other hand, if transmitter 37 were a CTC field transmitter, receiver 38 would correspond to the office receiving equipment which is conventional in such an installation. In either event, the information could be transmitted by conventional means to the cab of the locomotive transversing section 1T as well as to an operator in a central location. Since these and other details necessary to the incorporation of my system in an existing conventional telemetering system will be readily understood by those skilled in the art, they will not be further described.

If desired, the indication of the radiation detectors may also be employed to operate a signal in advance of track section 1T. As shown in FIG. 12, such a signal S may comprise a semaphore arm, schematically shown, actuated by conventional means, not shown, in conjunction with a pair of indicating lamps R and G which may be colored red and green, respectively.

As shown, output leads 43 and 44 of the radiation detectors are connected to energize a pair of slow release relays SPR and NPR, respectively. These relays are each provided with a front contact a over which a repeater of both relays, designated NSTP, is energized by an obvious circuit. Relay NSTP is provided with a front contact a which is included in parallel with the other conventional contacts, not shown, in the energizing circuit for red lamp R of signal S. Relay NSTP is also provided with a back contact b which is connected in series with conventional signaling contacts, not shown, in the energizing circuit for green lamp G. Accordingly, upon the response of either radiation detector the corresponding relay NPR or SPR will be energized and relay NSTP will be energized. With relay NSTP energized, all of the circuits for green lamp G will be interrupted and a circuit will be completed for energizing red lamp R and displaying the stop indication at signal S. While not shown, relays NPR, SPR and NSTP could obviously be provided with conventional stick circuits to hold them in their energized conditions, once energized, until manually released.

In illustrating the signal circuits just described, as is the practice, the power supplies have not been shown in detail, but their positive and negative terminals have been indicated by the symbols "B" and "N," respectively.

Figure 13:
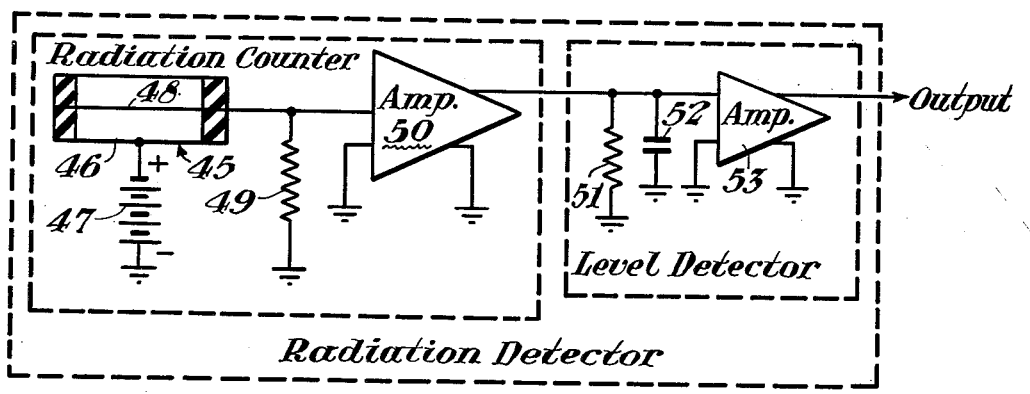
FIG. 13 is a schematic wiring diagram of a radiation detector adapted to be used in the system of FIG. 12.

Referring now to FIG. 13, a radiation detector which may be used for both the north and south radiation detectors 30 and 31 is shown. This radiation detector comprises a radiation counter and a level detector. The radiation counter comprises a conventional instrument such as the Geiger-Mueller tube 45 having its outer electrode 46 connected to the positive terminal of a battery 47, which has its negative terminal grounded as shown, and its internal lead 48 connected across a resistor 49 to ground.

The voltage appearing across resistor 49 is applied to an amplifier 50 as shown. As is known in the art, tube 45 comprises an ionization chamber across which a relatively high voltage, for example, 1200 volts, is provided, as by a battery 47. When a beta particle or a gamma ray passes through the chamber, ionization will occur and cause a momentary surge of current through the tube to develop a voltage across resistor 49, which is amplified in amplifier 50. The number of such pulses per second is determined by the intensity of the radiation impinging on the tube.

The level of the radiation is detected, in the embodiment of FIG. 13, by means of a level detector comprising an RC circuit including a resistor 51 and a capacitor 52 connected across the output of amplifier 50 and the input of an amplifier 53.

When pulses from amplifier 50 occur at infrequent intervals, insufficient charge will be developed across the input of amplifier 53 to overcome the bias on the amplifier. However, when pulses occur at or above a selected frequency, sufficient voltage will be developed across the input terminals of amplifier 53 to provide a voltage which is capable of operating the circuits previously described in connection with FIG. 12.

Referring now to FIG. 14, I have shown one means of mounting the radiation detectors of the system of FIG. 12 on the wayside. In order to orient the mounting unit I have shown fragments of a journal box 11, out of which projects tube 13 through fitting 15, the associated wheel 57 of the car, rail 56 and tie 58. The radiation detector is adapted to be enclosed in a housing 54 which has an opening at the top as shown, and which may have an outer portion composed of lead and an inner portion 55 made of iron to shield the radiation detector from the local radiation which normally occurs in lead.

As will be obvious, a radiation detector for use with the embodiment of FIG. 1 must be located farther away from the rails than the unit shown in FIG. 14, and must be high enough to view the end of the axle. It is believed that this mode of mounting will be sufficiently apparent not to require further description.

The operation of the thermally responsive radiation emitters of my invention is believed to have been sufficiently described above in the detailed description given in connection with FIGS. 1 through 11. The operation of the system of FIG. 12, however, will now be briefly described in terms of a typical example.

Let it be assumed that a ten-car train drawn by a six-axle locomotive is approaching track section 1T, and that this train has a hot bearing on the north side of the first axle on the third car. It is further assumed that the bearings of the train are protected by devices of, for example, the kind shown in FIGS. 2–7. Thus, in the journal box for the fifteenth axle on the north side, the radioactive pellet 19 of the apparatus of FIGS. 2–7 will be in the position shown in FIG. 5. The corresponding pellets for the remaining axles will be in the position shown in FIGS. 6 and 7.

As the train enters section 1T, track relay 1TR will be released and power will be supplied to counting chain 32 over back contact $a$ of relay 1TR. No further action will take place until the lead wheel of the locomotive passes detector coils 27 and 28, at which time magnetic detector 29 will supply a pulse of energy to leads 40.

With leads 40 energized, counting chain 32 will step from its count-0 condition to its count-1 condition; for example, by conduction of a first tube in response to the pulse, and preparation of the next tube for conduction in response to the next pulse. As each successive wheel of the train passes the detector coils, the action will be repeated, until the counter has accumulated a count of 14.

During the counting just described, neither of the radiation detectors will respond, since the sources of radioactivity located adjacent the bearings of the wheels are shielded. At the time that the fifteenth wheel is detected, however, North Radiation Detector 31 will receive an increased amount of radiation, causing the counter (see FIG. 13) to respond by applying a rapid series of pulses to R-C network 51, 52. Amplifier 53 will now conduct, and apply energy to lead 44 (see FIGS. 12 and 13).

Output leads 41 of counting chain 32 will be energized in the count-15 pattern. To visualize this action most simply, assume that there are fifty leads 41, each corresponding to a counting tube, and that the first fifteen of these are energized, while the remainder are deenergized. Of course, in practice, a more economical code form would be employed.

With lead 44 energized, a control pulse will be applied to the gates exemplified by 34, 35 and 36. A signal will then appear at the output of each of the gates having count energy applied to its input; for example, the first fifteen of fifty such gates might produce an output signal.

The modulating circuits of transmitter 37 will now be energized in the count-15 pattern from the gate outputs, and also from lead 44. Thus, a count corresponding to the number of the defective axle in the train and an indication of the side of the train on which the defective axle is located will be transmitted to receiver 38, which will respond in a conventional manner to actuate indicator 39.

If the signaling circuits of FIG. 12 are employed, relay NPR will now be energized over lead 44, and relay SPR will remain deenergized. Relay NSTP will next pick up over front contact $a$ of relay NPR. Lamp R of signal S will now be lit over front contact $a$ of relay NSTP, and all possible circuits for green lamp G will be interrupted at the open back point of contact $b$ of relay NSTP. Signal S will be caused to display its most restrictive aspect, by conventional means not shown in detail. The train will thus receive an indication causing it to stop. Preferably, signal S should be either restricted to hot bearing indications, or provided with a special bearing indication, so that the train crew will know the reason for the stop.

While I have described several embodiments of my invention in detail, many changes and modifications will become apparent to those skilled in the art on reading this description. Accordingly, I do not wish to be limited to the details shown, but only by the scope of the appended claims.

Having thus described my invention, what I claim is:

1. In combination, a journal box, a bearing housed in said box, a tube fastened at one end to said bearing and protruding downwardly through said box, a radioactive pellet positioned within said tube, fusible means in heat transfer relationship to said bearing and mounted in said tube to support said pellet, whereby upon overheating of said bearing said fusible means releases said pellet to fall through said tube, and means located at the protruding end of said tube to retain said pellet in a partly exposed position, and a radiation detector located outside of said box to respond to radiation from said pellet in its exposed position.

2. In a hot bearing detector, in combination, a railway journal box having an exposed base, a bearing enclosed in said journal box, a source of beta particles mounted externally on the base of said journal box, a shield mounted on said journal box for movement between a position shielding said source and a position exposing said source, means including a fusible link in heat transfer relation to said bearing connected between said bearing and shield to hold said shield in its shielding position, and means for resiliently biasing said shield to its source-exposing position.

3. A hot bearing detector, comprising, in combination, a railway journal box having an exposed base, a bearing enclosed in said journal box, a radioactive element mounted externally on the base of said box, a shield mounted on said journal box for movement between a position shielding said element and a position exposing said element, means including a fusible link in heat transfer relation to said bearing connected between said bearing and shield to hold said shield in its shielding position, means for resiliently biasing said shield to its element exposing position, and a radiation detector mounted below said box to respond to exposed radiation from said element.

4. A hot bearing detector, comprising, a railway journal box, a bearing enclosed in said journal box, a tube fastened within said box and protruding downwardly through said box, a radioactive pellet positioned within said tube, thermally responsive means in heat transfer relationship to said bearing and mounted in said tube to support said pellet, the lower portion of said tube being offset from the pellet supporting portion to at least partially shield said pellet, said thermally responsive means releasing said pellet to fall through said tube in response to temperatures of said bearing in excess of a predetermined temperature, means located at the protruding end of said tube to retain said pellet in a partly exposed position, and a radiation detector located outside of said box to respond to radiation from said pellet in its exposed position.

References Cited by the Examiner
UNITED STATES PATENTS

| | | | |
|---|---|---|---|
| 345,447 | 7/86 | Putzeys | 116—106 |
| 1,979,875 | 11/34 | Faus. | |
| 2,418,579 | 4/47 | Cranwell | 246—169 |

(Other references on following page)

UNITED STATES PATENTS

| | | | |
|---|---|---|---|
| 2,468,905 | 5/49 | Warren. | |
| 2,508,510 | 5/50 | Gillepsie | 246—169 |
| 2,543,161 | 2/51 | Faus | 246—169 X |
| 2,552,271 | 5/51 | Faus | 246—169 X |
| 2,620,435 | 12/52 | Vogt et al. | 246—29 |
| 2,829,267 | 4/58 | Howell | 246—169 |
| 2,880,309 | 3/59 | Gallagher et al. | 246—169 |
| 2,963,575 | 12/60 | Pelino et al. | 246—169 |
| 3,076,089 | 1/63 | Spalding | 246—169 |
| 3,090,859 | 5/63 | Rodin | 246—169 |

FOREIGN PATENTS

| | | |
|---|---|---|
| 69,401 | 7/58 | France. |
| 800,190 | 8/58 | Great Britain. |

OTHER REFERENCES

S.H.A., German application 1,002,381, printed Feb. 14, 1957.

ENGENE G. BOTZ, *Primary Examiner*.

LEO QUACKENBUSH, ARTHUR L. LA POINT,
*Examiners*.